Inventors:
Charles A. Parsons,
Stanley S. Cook,
Edward B. Chapman

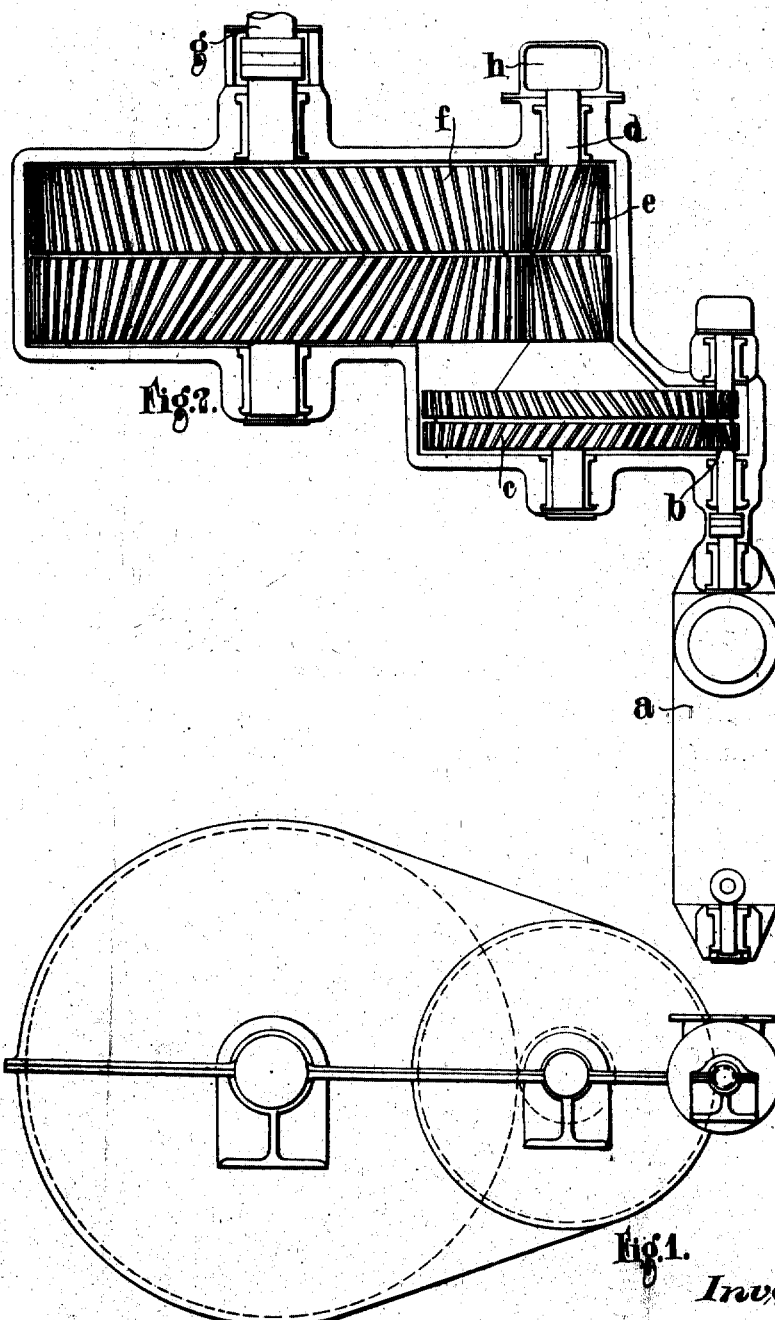

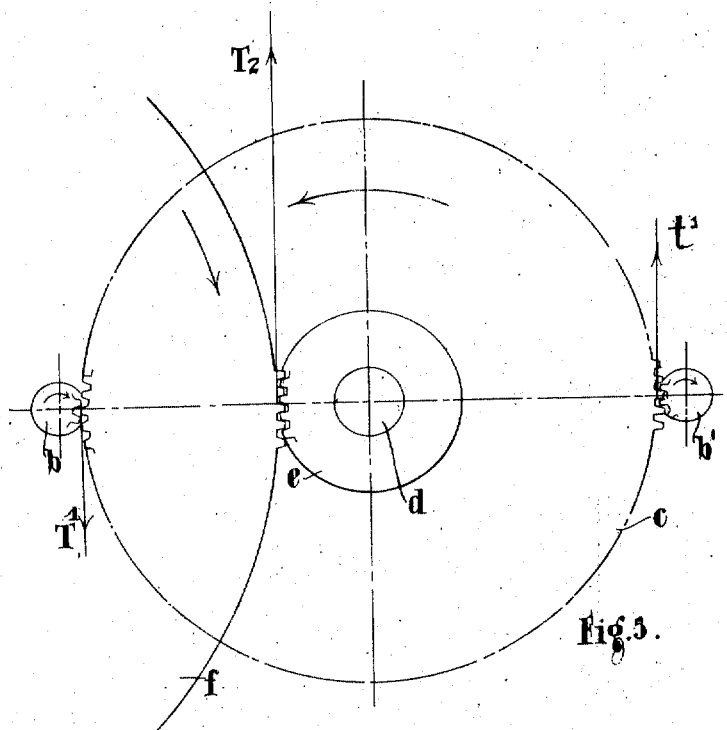
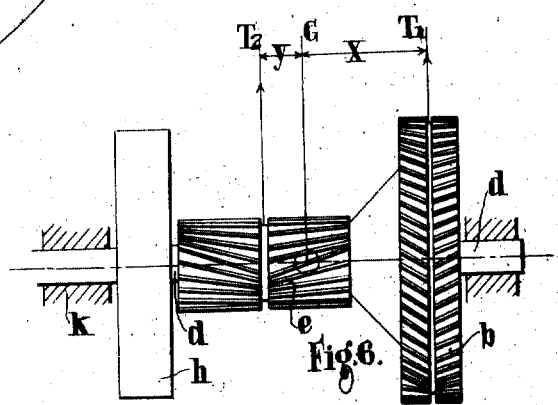

UNITED STATES PATENT OFFICE.

CHARLES ALGERNON PARSONS, STANLEY SMITH COOK, AND EDWARD BROOKS CHAPMAN, OF NEWCASTLE-UPON-TYNE, ENGLAND; SAID COOK AND SAID CHAPMAN ASSIGNORS TO SAID PARSONS.

GEAR-TRAIN.

1,302,963.   Specification of Letters Patent.   Patented May 6, 1919.

Application filed October 30, 1917. Serial No. 199,341.

*To all whom it may concern:*

Be it known that we, CHARLES ALGERNON PARSONS, STANLEY SMITH COOK, and EDWARD BROOKS CHAPMAN, subjects of the King of Great Britain and Ireland, residing at Heaton Works, Newcastle-upon-Tyne, in the county of Northumberland, England, have invented certain new and useful Improvements in Gear-Trains, of which the following is a specification.

The present invention relates to improvements in gear trains and has for its object to construct an intermediate shaft in a gear train in such a manner that it will retain a satisfactory alinement under all load conditions.

In gear trains having an intermediate shaft carrying a gear wheel and pinion the principal forces acting on the intermediate shaft of the gear train will in general be the tooth reactions of the gear wheels on the shaft and the weight of the whole shaft. These forces are sustained by the pressures on the bearings. At some loads, in cases in which the forces arising from the tooth reactions act in an upward direction these forces together may be sufficient to overcome the weight of the shaft and the shaft will rise in its bearings. The end toward which the pinion lies will rise first, since this is the lighter end of the shaft. This end is at the same time subject to greater forces from the tooth reactions. There will, therefore, be a range of loads at which the shaft will tend to lie obliquely between its bearings, and with the clearances which it is necessary to provide in practice for high speed journals the shaft will lie obliquely for these intermediate loads, thus throwing the teeth of the wheels out of alinement with the teeth with which they have to engage, thus producing unsatisfactory distribution of pressures and high local stresses on the teeth.

The present invention consists in employing a balance weight on the intermediate shaft so arranged that the center of gravity of the shaft taken as a whole substantially coincides with the point at which the resultant of the other vertical forces acting on the shaft crosses the shaft axis.

The invention further consists in the improved gear trains hereinafter described.

Referring to the accompanying drawings:—

Figure 1 is an elevation, and

Fig. 2 is a plan of a single power unit double-reduction installation in which the intermediate shaft is provided with a balance weight according to the invention.

Fig. 5 is a diagram of the forces for an intermediate shaft which is driven by two separate pinions, while Fig. 6 shows an alternative form in which the balance weight is placed between the secondary pinion teeth and the adjacent bearing.

In the form of the invention illustrated in Figs. 1 and 2, the power unit $a$ is provided with a double helical pinion $b$ driving the double helical gear wheel $c$ on the intermediate shaft $d$. The intermediate shaft also carries a double helical pinion $e$ which drives the gear wheel $f$ on the driven shaft $g$. A balance weight $h$ is placed at the end of the intermediate shaft $d$ remote from the wheel $c$.

Figure 3:
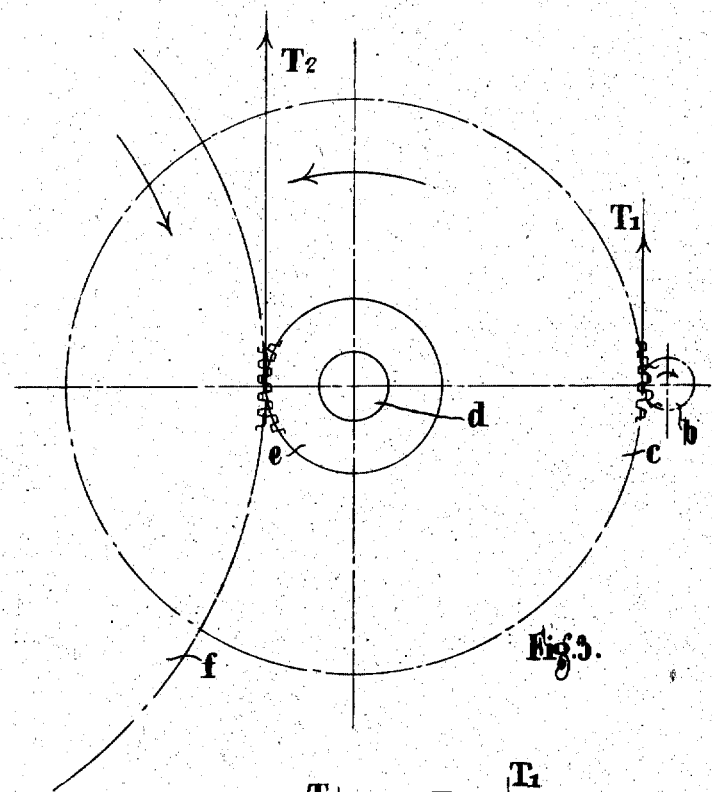
Figs. 3 and 4 are diagrams of the forces acting on the intermediate shaft for the same installation.

Fig. 3 shows projected on to a transverse plane the vertical turning forces, $T_1$ and $T_2$, of the intermediate shaft, acting respectively at the primary and secondary gear teeth. Except for the small torque necessary to overcome friction these forces are in equilibrium about the axis of the shaft. They have therefore a single resultant G, whose line of action passes through this axis and which is equal to the sum of $T_1$ and $T_2$.

Figure 4:
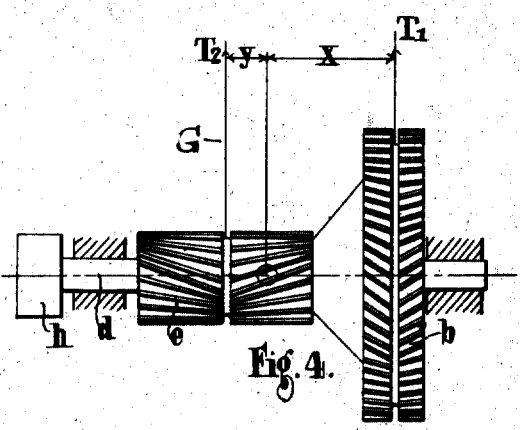

Fig. 4 is a vertical section through the axis of the shaft, showing the line of action of the resultant G, and the projections of the lines of action of the forces $T_1$ and $T_2$. The distances $x$ and $y$ will be inversely proportional to the forces $T_1$ and $T_2$.

These forces $T_1$ and $T_2$ having the resultant G and acting vertically upward operate to overcome the weight of the intermediate shaft $d$ and tend to lift it in its bearings. The balance weight $h$ is attached to the shaft and is so proportioned and disposed that the center of gravity of the whole shaft is made to lie in the line of action of the resultant G. The weight W of the shaft $d$ and the force G will thus be directly opposed to each other so that with the increasing load when passing through the stage at which G is equal to W the forces will not produce a couple tending to tilt the shaft $d$. This shaft will therefore rise evenly in its bearings. Similarly with decreasing loads when passing through the same stage the shaft will fall evenly in its bearings, and thus, under all conditions of load, will retain its correct alinement in the vertical plane.

The diagram Fig. 5 shows the forces in the case in which two primary pinions $b$ $b'$ are placed diametrically opposite to each other and transmit equal forces to the primary wheel $c$. In this case we have acting on the intermediate shaft vertical forces $T_1$ and $t_1$, on the primary teeth, and $T_2$ on the secondary teeth. These are in equilibrium about the axis of the shaft; they have, therefore, a single resultant whose line of action passes through the axis. The forces $T_1$ and $t_1$ produce no resultant force but only a turning moment which is equal and opposite to the moment of $T_2$ about the axis of the shaft. The resultant of all these forces is therefore a force acting vertically upward through the axis of the shaft, and equal to and in the same transverse plane as $T_2$. In this case, therefore, the balance weight must be so designed that the center of gravity of the whole shaft and the line of action of the force $T_2$ lie in the same transverse plane.

In the form of the invention shown in Fig. 6 the balance weight $h$ is placed between the pinion $e$ and the bearing $k$ and it will be seen that this arrangement requires a much heavier balance weight than is required in the preferred arrangement shown in Figs. 1 and 2.

It will be seen that the balance weight may either be integral with the shaft $d$ or may be made separately and attached thereto.

By the above described arrangement we obtain an intermediate shaft which keeps a satisfactory alinement under any load conditions.

The invention is particularly advantageous in cases in which it is undesirable to employ separate shafts carrying respectively the intermediate wheel and pinion with a flexible coupling connecting them.

Having now described our invention, what we claim as new and desire to secure by Letters Patent is:—

1. In combination in multiple reduction gearing a gear, and a pinion, a shaft on which the pinion is mounted, and a balance weight arranged on the shaft of the pinion in such position that the center of gravity of the shaft taken as a whole substantially coincide with the point at which the resultant of the other vertical forces acting on the shaft crosses the shaft axis, substantially as described.

2. In combination in multiple reduction gearing, a gear and a pinion meshing with each other, a shaft on which the pinion is mounted, and means for pressing said shaft in opposition to its tendency to tilt when, under varying loads, the forces acting in the upward vertical direction become equal to the weight of the shaft, said means consisting of a circular weight arranged coaxially with the shaft and exerting a uniform pressure on said shaft in all angular positions thereof, substantially as described.

3. In multiple reduction gearing, a driving shaft, a driven shaft, an intermediate shaft, a pinion on said driving shaft, a gear wheel on said intermediate shaft, a pinion on said intermediate shaft, a gear wheel on said driven shaft, and a balance weight on said intermediate shaft so arranged that the center of gravity of the shaft coincides with the point at which the resultant of the other vertical forces acting on the shaft crosses the shaft axis, as and for the purposes set forth.

In testimony whereof, we have affixed our signatures.

CHARLES ALGERNON PARSONS.
STANLEY SMITH COOK.
EDWARD BROOKS CHAPMAN.